UNITED STATES PATENT OFFICE.

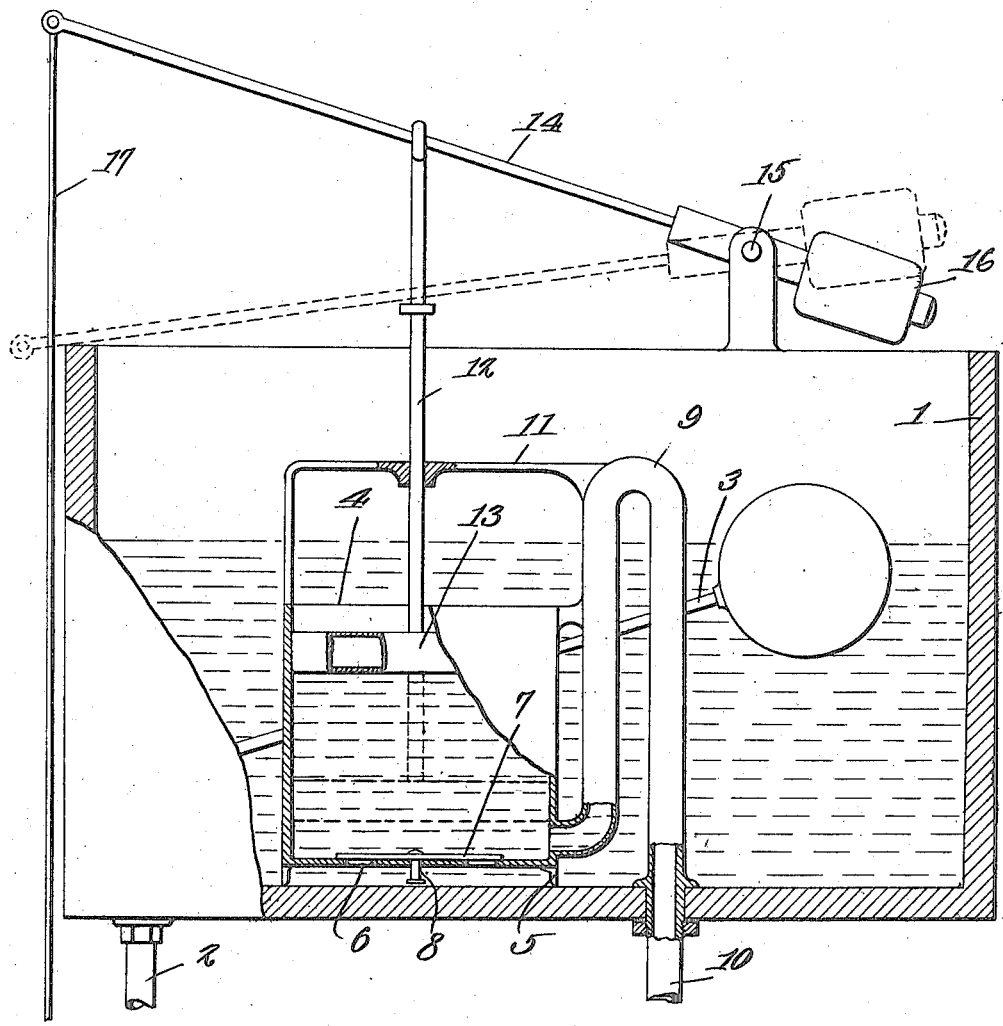

CEPHAS V. FITE, OF CHARLOTTE, NORTH CAROLINA, ASSIGNOR OF ONE-HALF TO WALTER W. WATT, OF CHARLOTTE, NORTH CAROLINA.

FLUSH-VALVE.

1,270,506.

Specification of Letters Patent.

Patented June 25, 1918.

Application filed October 3, 1916. Serial No. 123,555.

*To all whom it may concern:*

Be it known that I, CEPHAS V. FITE, a citizen of the United States, residing at Charlotte, in the county of Mecklenburg and State of North Carolina, have invented a new and useful Flush-Valve, of which the following is a specification.

This invention relates to flush valves, one of its objects being to provide means whereby a siphonic action can be set up positively whenever desired, thus to insure the discharge of all of the liquid contents of the flush tank, the operating parts of the structure being simple, durable and efficient and easy to operate.

A further object is to provide operating means which will be automatically reset by the filling of the tank.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a view partly in section and partly in elevation of a flush valve embodying the present improvements, the preferred form of the invention has been shown.

Referring to the drawings by characters of reference 1 designates a tank having a water inlet pipe 2 and a float controlled valve indicated generally at 3 whereby the admission of water into the tank may be stopped when a predetermined amount has been delivered to the tank.

Mounted within the tank 1 is a cylinder 4 the bottom of which is spaced from the tank by legs 5 or any other suitable means. This cylinder has one or more inlet openings 6 in the bottom thereof normally closed by a disk 7 having a stem 8 slidably mounted in the bottom of the cylinder. This disk thus constitutes a valve for preventing escape of water downwardly from the cylinder while permitting it to flow freely into the cylinder.

A siphon 9 is arranged within the tank 1 and close to cylinder 4 and the short arm of this siphon opens into the lower portion of the cylinder while the long arm thereof is connected to an outflow pipe 10. A guide 11 is mounted above the cylinder 4 and slidably mounted therein is a rod 12 to the lower end of which is secured a float 13 in the form of a piston designed to reciprocate within the cylinder 4. The upper end of the rod is movably connected to the long arm of an actuating lever 14 fulcrumed as at 15 above or adjacent the tank, the short arm of this lever being provided with a counter balance or weight 16 while the long arm thereof is connected to an actuating means such as a rod 17 or the like.

It will be obvious that when the tank 1 is filled to the desired level, the float 13 will be elevated within the cylinder 4 and will thus support lever 14 in a raised position. However, as the siphon 9 extends above the level of the water, none of the contents of the tank will flow therefrom through the siphon. When it is desired to discharge the contents of the tank lever 14 is pulled downwardly and thus thrusts through the rod 12 upon the float piston 13 and causes said piston to move downwardly in cylinder 4. Consequently the water contained in the cylinder and below the piston will be expelled through the siphon 9 thereby setting up a siphonic action so that all of the water contained in the tank 1 will flow from said tank upwardly through the openings 6 and into the siphon and thence outwardly into the pipe 10. As soon as the water has been discharged from the tank the siphonic action will be broken or interrupted whereupon the valve controlling the supply of water to the tank and which has been opened by the descent of its float, will allow the water to flow into the tank, thereby gradually raising the float piston 13 and lever 14 to the positions indicated by full lines in the drawing.

What is claimed is:—

1. The combination with a tank having an inlet, of a cylinder within the tank and formed with an open upper end located below the water level of the tank, said cylinder provided with a valved inlet, a siphon having its short arm connected to the lower portion of the cylinder and its long arm constituting an outlet from the tank, a combined float and piston mounted in the cylinder, and operating means connected thereto.

2. The combination with a tank having an inlet, of a cylinder within the tank formed with an open upper end located below the water level of the tank, legs on the cylinder and holding the cylinder spaced from the bottom of the tank, said cylinder provided with inlet ports in its lower end, a valve overlying the inlet ports, a siphon having its short arm connected to the lower portion of the cylinder and its long arm constituting an outlet from the tank, a combined float and piston mounted within the cylinder and operating means connected thereto.

3. The combination with a tank having an inlet, of a cylinder within the tank and formed with an open upper end located below the water lever of the tank, said cylinder provided with a valved inlet, a siphon having its short arm connected to the lower portion of the cylinder and its long arm constituting an outlet from the tank, a normally submerged combined float and piston mounted in the cylinder, and operating means connected thereto.

In testimony that I claim the foregoing as my own, I have hereto affixed my signature in the presence of two witnesses.

CEPHAS V. FITE.

Witnesses:
W. P. TODD,
ANNIE BELLE STRICKLAND.

Copies of this patent may be obtained for five cents each, by addressing the "Commissioner of Patents, Washington, D. C."